United States Patent

[11] 3,595,509

| [72] | Inventors | Harold J. Gilmoure |
| | | Shaker Heights; |
| | | William B. Comiskey, University Heights, both of, Ohio |
| [21] | Appl. No. | 736,467 |
| [22] | Filed | June 12, 1968 |
| [45] | Patented | July 27, 1971 |
| [73] | Assignee | Sales Promotion Products, Inc. Cleveland, Ohio |

[54] A-FRAME, TIRE-SUPPORTED SIGNBOARD
16 Claims, 3 Drawing Figs.

| [52] | U.S. Cl. | 248/175 |
| [51] | Int. Cl. | F16m 11/00 |
| [50] | Field of Search | 248/175, 460, 463, 465, 175; 40/125 M, 125 H |

[56] References Cited
UNITED STATES PATENTS

| 1,709,822 | 4/1929 | Griffith | 248/465 |
| 1,513,446 | 10/1924 | Craft | 40/125 H |
| 2,965,159 | 12/1960 | Fridolph | 248/465 |
| 3,305,960 | 2/1967 | Huey et al. | 40/125 M |

Primary Examiner—Edward C. Allen
Attorney—Bosworth, Sessions, Herrstrom and Cain ABSTRACT: An A-frame signboard which is collapsible and separable for ease of handling, shipping and storage and is secured and held in an upright position, while in use, by coaction with and mounting within a tire, or the like. The signboard is formed of bent and shaped wire, has two essentially similar halves for ease and efficiency of manufacture and includes a plurality of shaped and formed apertures for reception of mounting bolts for holding signs, posters, and the like, thereon.

PATENTED JUL27 1971
3,595,509
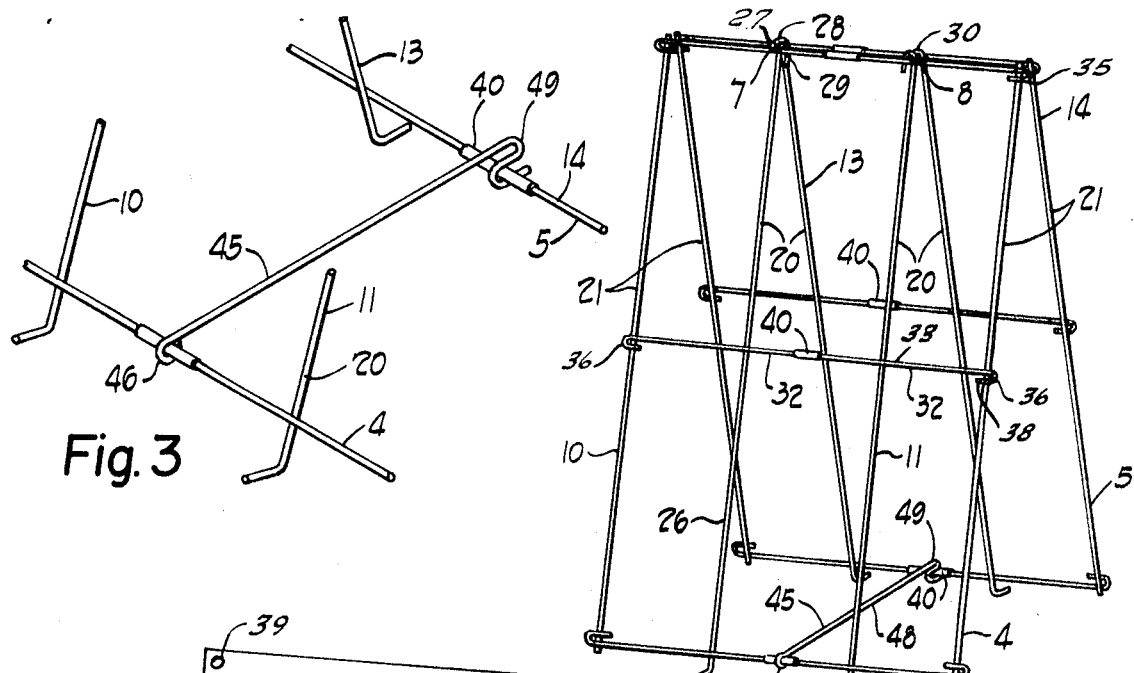
Fig. 3
Fig. 2
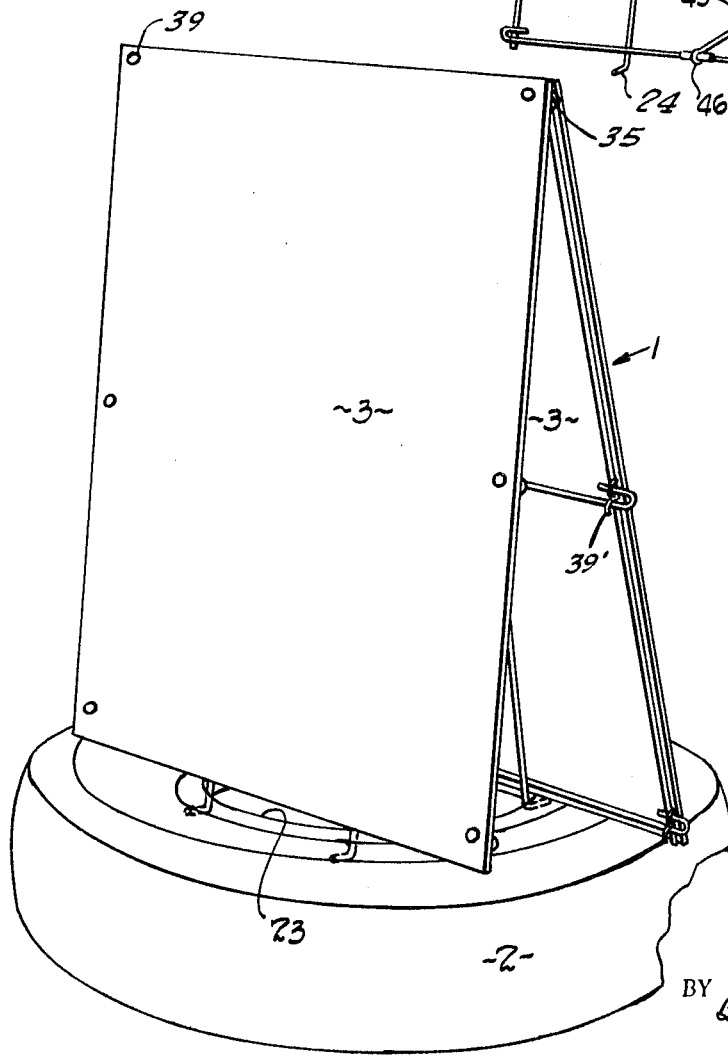
Fig. 1
INVENTOR.
HAROLD J. GILMOURE
WILLIAM B. COMISKEY
BY Bosworth, Sessions,
Herrstrom + Cain
ATTORNEYS.

A-FRAME, TIRE-SUPPORTED SIGNBOARD

BACKGROUND OF THE INVENTION

1. Field of the Invention

This invention relates to mounting devices for posters, advertising signs, and the like, and, more particularly, to an A-frame signboard which is adapted for mounting and support on and within a tire or other separate torus-shaped article.

2. Description of the Prior Art

Signboards or poster and sign mounting devices which are held within or under or supported by an ordinary automobile tire, or the like, are old and known in the art. Such boards have been supported on or within the wheel opening of tires, which stand vertically or on edge and are held in that position by a suitable stand, as well as tires which lie horizontal on the ground or supporting surface.

Since ordinary automobile tires (both used and new) are commonly found around service stations, garages, and the like, signs relating to the activities of the particular business and the products and services it has for sale and supported against upsetting by wind and other forces by tires seem to be a logical adaptation and use of the tires. This is especially so when the signs, as is frequently the situation, advertise the sale of tires.

In fact simple, flat circular signs for mounting within the central wheel opening of a tire have been widely used for advertising the sale of tires. Such signs have the disadvantage however, that they are limited in size to the wheel opening and/or by the fact that the supporting tire must be on edge or vertical. This latter fact requires a separate holding device to maintain the tire in an upright position.

Vertical signboards supported on and in a horizontally disposed tire have also been used in the prior art. They have the advantage of larger size, since their height and exposed width are usually independent of the wheel opening diameter, and of obviating the need of stands, or other tires or apparatus for supporting the tire in a vertical position.

Nonetheless, despite their obvious appeal and utility in certain environments, signboards for use in and with and to be supported by and in coaction with a tire and, in particular, a tire lying horizontal on the ground, driveway or other surface have not come into widespread use nor been commercially adopted on the scale and in the manner to be expected.

Since the tires are available and of "standard" design and size, it follows that the signboards themselves, in their own structure, per se, and in the structure by which they coact and cooperate with the tire to provide a unitary or functional whole, have been insufficient and inadequate in a very real sense.

SUMMARY OF INVENTION

The general object of this invention is, therefore, to provide a new and improved A-frame signboard for use and mounting with and on a tire, and the like and to provide such a new and improved signboard having new and improved means for engaging and coacting with the tire, or the like.

Other objects of this invention include the provision of a new and improved A-frame signboard for mounting and use with and on tires, and the like, which is collapsible and separable, and the provision of such a collapsible and separable A-frame signboard which is efficient and economical to manufacture and use; which is collapsible and separable so as to have increased ease and utility of handling, shipping and storage; which collapses and disassembles into a compact "package," yet is readily and easily reassembled and used; which is easily used and mounted even by unskilled persons; which includes two halves or parts which are substantially the same in structure, thereby further facilitating manufacture and reducing costs; which embodies a minimum number of structurally different parts whereby to increase the efficiency of the display board and lower the costs of manufacture; which is made from bent and formed wire members; which has a new and improved, but simple, structure for providing a new and improved engagement and coaction with the tire, or the like, with which the signboard is to be used; which includes a plurality of receptacles or apertures for the reception of fastening means so that posters, advertising signs, and the like, may be detachably mounted thereon; which is easily adapted, upon manufacture or subsequently in the field, for use with tires having a wheel opening of any predetermined diameter; and which efficiently and effectively, alone and in cooperation with the tire, protects the poster, advertising sign, or the like, mounted thereon from deleterious effects due to tipping over because of winds or other causes.

A still further object of this invention is to provide a new and improved A-frame signboard and a new and improved combination of A-frame signboard and tire, and the like, obtaining one or more of the objects and advantages set forth above.

These and other objects and advantages of this invention will appear from the following description of preferred forms thereof.

BRIEF DESCRIPTION OF THE DRAWINGS

FIG. 1 is a perspective view showing a preferred form of this invention in use with a poster mounted thereon.

FIG. 2 is a perspective of an A-frame signboard embodying a preferred form of this invention, without the tire.

FIG. 3 is a broken perspective view, on an enlarged scale, showing a preferred form of locking mechanism for obtaining an improved coaction between the tire and A-frame signboard.

DESCRIPTION OF THE PREFERRED EMBODIMENT

An A-frame signboard embodying a preferred form of this invention is indicated generally at 1, FIG. 1. A-frame 1 is shown with a tire 2 upon which it is mounted and with which it coacts and with posters or advertising signs 3 mounted thereon.

A-frame 1 comprises two sides 4 and 5, respectively, FIG. 2, which are hinged or otherwise secured together as at 7 and 8 to define the upper or apex of the "A." The posters, cards or signs 3 to be displayed are mounted on the outer, relative to the "A" itself, faces of the sides 4 and 5.

In order to facilitate manufacture, storage, shipment, handling and use, and accomplish the other objects and advantages of this invention, each side 4 and 5 of A-frame 1 preferably has the same structure, function and mode of operation as the other, except that one side 4, for example, carries the locking or bracing means by which the A-frame is mounted in and coacts with the tire 2.

Also, each side 4 and 5 of A-frame 1 comprises two halves 10 and 11 and 13 and 14, respectively, which are the same in structure, function and mode of operation except that the means by which the halves are coupled or joined together are preferably fixedly secured to one-half and only detachably engage the other. However, such coupling means could detachably engage both halves with the disadvantage that the same may become lost or separated from the frame or more easily displaced, so as to permit separation of the joint or junction, when the A-frame is assembled and in use.

To this end, each half 10, 11, 13 and 14 of each side 4 and 5, respectively, of A-frame 1, comprises a plurality of vertical members 20 and 21. The number of said members 20 and 21 depends, of course, on the size of the A-frame and, more particularly, on the width of the placard or card to be displayed thereon. Further, each of vertical members 20 and 21, respectively, are the same in structure, function, and result in each side and half side to the end that the number of parts necessary to assemble an A-frame embodying this invention is kept to a minimum consistent with the purposes and objects of the invention.

Each half 10, 11, 13 and 14, preferably includes one vertical member 20, which is positioned, as will hereinafter be more fully described, so as to engage under the lip or bead 23, FIG. 1, of the tire with which the A-frame is to be used. The members 20 on the same side of the A-frame are spaced apart a convenient distance to provide necessary stability when both are disposed under lip or bead 23 and at the ends of the chord of the tire wheel opening extending therebetween. Stability being dependent not only on the spacing, per se, of the members 20 on the same side are spread apart at their lower, as viewed and used, edges when all of the members 20 are positioned in the manner and for the purpose set forth above.

Members 20, are preferably formed of metal wire bent and shaped to provide a lower foot portion 24, a vertical leg portion 26 and an upper loop portion 27.

Foot portion 24 is bent at an angle relative to leg portion 26 to extend outwardly, relative to the A-frame, to provide the means referred to above for engaging beneath the lip or bead of the tire with which the A-frame is to be used and is of sufficient length to accomplish this purpose. Leg portion 26 is of a convenient length, preferably substantially equal to the height of the placard or sign to be mounted on the A-frame. Loop portion 27 lies in a plane parallel with the plane of the side of which it is a part and preferably is U-shaped having a semicircular base 28 and reentrant arm portion 29 which extends for a short distance parallel with leg portion 26 to and for the purposes to be hereinafter more fully described. Further, the members 20 on the same side, 4 or 5, of the A-frame 1 preferably have their loop portions 27 bent in opposite directions relative to the center of the side of which they are part and the adjacent members 20 of the two sides are juxtaposed or disposed in substantially the same transverse, vertical plane so that the two sides may be hinged together, upon final assembly of the A-frame, by threading a wire 30, or split ring, through the adjacent loop portions 27 to form a hinge (hinges 7 and 8, respectively, referred to above).

Alternatively, the loop portion of each member 20, could be bent in the same direction and the adjacent members on the opposite sides 4 and 5 offset transversely so that the loop portions are aligned as described above. And, of course, the loop portion 27 may form a complete circle or take another shape, if desired, provided they function in the manner and obtain the results set forth herein.

Each half side 10, 11, 13 and 14 also preferably includes one or more members 21, which, preferably, are straight, formed of wire and have a length substantially equal to the height of the placards or signs to be mounted on said A-frame.

The number of members 21 in each half side depends on the size of the A-frame, but there should be a vertical member 21 at the outer edges of each side to and for the purposes to be hereinafter more fully described. Also, the loop portion 27, described above, may, as a further alternative, be formed on one of the vertical members 21 on each half to form a part of the hinges 7 and 8, respectively. By so doing the loop portions may be easily aligned, since there is no angled portion, such as foot 24, on the members 21 to determine loop portion direction and the member and loop portion may be turned, as desired, to align the adjacent loop portion on the members 21 of the opposite sides 4 and 5. Note, with respect to these preferred and alternate embodiments, that half sides 10 and 13 and 11 and 14 are, in each event, the same in these regards.

Each half side 10, 11, 13 and 14 also includes a plurality of horizontal members 32, with at least one said member disposed at the top and one at the bottom of the half side. Also, at least certain of the horizontal members of each half side of the same side, are aligned vertically to provide means to be hereinafter more fully described, for joining the half sides together.

Each member 32 is conveniently formed of bent and shaped wire and includes a horizontal leg portion 33 and a loop portion 35, which preferably includes a semicircular base 36 and reentrant leg portion 38, which conveniently and preferably is the same in structure as the loop portion 27 described above.

The horizontal and vertical members 20, 21 and 32 of each half side overlie each other and are joined together by any suitable means, such as soldering, to form a unitary whole and are preferably disposed so that the reentrant portion 29 of each loop portion 27 may be connected with the top horizontal member 32 and the reentrant leg portion 38 of each loop portion 35 may be connected to the outermost vertical member 21 leaving, in each instance, an aperture defined by the loop portion and the leg of the member to which it is connected. As noted above, the apertures thus formed with loop portions 27 are used to provide hinge means between the two. On the other hand, the apertures formed by the loop portions 35 are used for mounting the placards or signs 3 on the A-frame, by any suitable fastening means, such as, for example, nuts and bolts 39 or brads 39', FIG. 1, which pass through the sign and the aperture and are fastened together in a conventional manner. Also, loop portions 27 and 35 may be formed as a complete circle and when the loop portions are thus formed, members 20, 21 and 30 need not be assembled, as described, to form apertures by this means of intersection.

In order to secure the two halves 10 and 11 or 13 and 14 of a side together, coupling members 40 are provided. Members 40 are conveniently hollow cylinders having an inner diameter such as to have a close sliding fit with respective horizontal members 32. Each coupling member 40 is adapted to slide over the adjacent and aligned ends (inner as viewed) of the horizontal members 30 to couple the two halves of a given side together. Each coupling member 40 is preferably secured, as by soldering, to one of the pair of members 32 which it is to join in order to prevent loss thereof and to ensure proper positioning and overlap on the joined members. Also, coupling members 40 can be omitted from certain pairs of horizontal members 32, if desired.

A-frame 1 also includes means for locking or bracing the lower edges of the respective sides 4 and 5 so as to retain the feet 24 in position beneath the bead or lip 23 of tire 2 and to obtain an improved and new coaction with the tire whereby a more functionally unitary, convenient and stable signboard is obtained.

Such means detachably interlocks the lowermost, or other suitable, horizontal member 32 of the sides 4 and 5, respectively, and conveniently and preferably comprises a bent, and shaped wire brace member 45, having a closed loop portion 46, which is slid over the horizontal member of one side, 4, for example, before the same is assembled, a straight midportion 48 of predetermined length and a formed hook portion 49 providing an open loop for engagement over the horizontal member of the opposite side, 5, for example. Midportion 48 of brace member 45 is of sufficient length to ensure that the lower edges of the A-frame are held apart under stress when the feet 24 are positioned beneath the tire bead and hook portion 49 has a sufficient depth to fully receive the horizontal member 32 and prevent its accidental disengagement.

Loop portion 46 has a loose connection with the horizontal member 32 so that brace member 45 may be positioned by canting the same to engage hook position 49 over the horizontal member and then sliding the hook along the horizontal member until the brace member 45 extends straight and perpendicular between the sides as shown in FIGS. 2 and 3. Other forms and shapes of brace member may be used, provided they hold the respective sides apart and maintain the feet in position beneath the tire bead.

The signboard rests with the lowermost horizontal members 32 on the tire and these members are positioned, relative to the feet 24, so that the engagement is snug and convenient.

In practice, the half sides 10, 11, 13 and 14 are assembled and the A-frame is then stored and shipped in a knocked down state together with brace 45 and hinge members 30.

When ready for use the brace 45 is positioned over a horizontal member, the sides are assembled from their respective halves and then joined together by means of hinge members 30. The signboard is then completed for use by simply mounting the placard or sign on the A-frame and positioning the A-frame in a tire, both as described above, and for the purposes set forth.

Further, while the parts have been described as bent and shaped wire, they may be made of other suitable materials, as long as they obtain the same functions, objects and results, respectively.

Modifications and changes to the preferred forms of the invention disclosed herein may occur to those skilled in the art who come to understand the principles and precepts thereof. Accordingly, the scope of the patent to be issued hereon should not be limited to the forms of the invention herein specifically described but by the advance by which the invention has promoted the art.

We claim:

1. An A-frame for use with a tire, having a wheel opening with a bead therearound to form a signboard, for displaying posters, advertising signs, and the like said A-frame comprising first and second sides hinged together at the apex of the A, each said side having means for engaging beneath the tire bead, brace means extending between said sides remote from said apex and holding and forcing said engaging means into a coactive engagement with said tire when said A-frame is mounted thereon, each said side comprising two substantially similar halves, each said half comprising two substantially similar halves, each said half comprising a plurality of vertical and horizontal members, respectively, certain of said vertical and horizontal members respectively having apertures at their ends remote from said engaging means and the center of said side, respectively, certain of said apertures on said vertical members receiving hinge means by which said sides are hinged together, said apertures on said horizontal members being adapted to receive fastening means whereby a poster advertising sign, and the like is mounted and held on said A-frame, and coupling means joining certain of said horizontal members of each half of said side together to form a said side.

2. The A-frame according to claim 1 in which each said hinge means comprises a wire loop extending through adjacent apertures on each said side, respectively.

3. The A-frame according to claim 1 in which said brace means comprises a rigid bent and shaped wire member hingedly connected to a said horizontal member of one said side and detachably engaging a said horizontal member of the other said side.

4. In combination an A-frame signboard and a tire having a wheel opening surrounded by a bead for displaying posters, advertising signs, and the like said A-frame signboard comprising first and second sides, hinge means hinging said sides together remote from said tire, each said side having means engaging beneath said tire bead, brace means extending between said sides remote from said hinge means and holding and forcing said engaging means, respectively, into a coactive engagement with said tire, each said side comprising two substantially similar halves, each said half comprising a plurality of vertical and horizontal members respectively certain of said vertical and horizontal members having apertures at their ends remote from said tire and the center of said side, respectively, certain of said apertures on said vertical members receiving means by which said sides are joined together to form said hinge means, other of said apertures being adapted to receive fastening means whereby a poster, advertising sign, and the like, is mounted and held on said A-frame, and coupling means joining certain of said horizontal members of each half of a said side together to form a said side, said vertical and horizontal members being formed of bent and shaped wire and having a leg portion, said certain of said vertical and horizontal members having an open ended U-shaped portion at said end, each said aperture being formed by a said U-shaped portion and a said leg portion of another said member extending across said open end and joined to said member of which said U-shaped portion is a part.

5. The combination according to claim 4 in which a said vertical member on each half of each said side has a lower end, said end is bent at an angle to said leg portion and extends beneath said bead of said tire, and said engaging means comprises said angularly bent portions of said vertical members, respectively.

6. The combination according to claim 4 in which each said joining means comprises a wire loop extending through adjacent apertures on each said side, respectively, and said brace means comprises a rigid bent and shaped wire member hingedly connected to a said horizontal member of one said side and detachably engaging a said horizontal member of the other said side.

7. In combination an A-frame signboard and a tire having a wheel opening surrounded by a bead for displaying posters, advertising signs, and the like said A-frame signboard comprising first and second sides, hinge means hinging said sides together remote from said tire, each said side having a horizontal member and means engaging beneath said tire bead, brace means extending between said sides remote from said hinge means and holding and forcing said engaging means, respectively into a coactive engagement with said tire, said brace means comprising a rigid bent and shaped wire member having a straight central portion with two ends, one said end of said brace means being formed into a closed loop and the other said end being formed with a U-shaped loop having an outwardly facing opening, said closed loop circumscribing said horizontal member of one said side and having a freely rotatable engagement therewith, and said outwardly opening, U-shaped loop of said brace means being positioned about a said horizontal member of the other said side.

8. An A-frame for use with a tire, having a wheel opening with a bead therearound to form a signboard, for displaying posters, advertising signs, and the like, said A-frame comprising first and second sides hinged together at the apex of the A, each said side having means for engaging beneath the tire bead, brace means extending between said sides remote from said apex and holding and forcing said engaging means into a coactive engagement with said tire when said A-frame is mounted thereon, each said side comprising two substantially similar halves, each said half comprising a plurality of vertical and horizontal members, certain of said vertical and horizontal members having apertures at their ends remote from said engaging means and the center of said side, respectively, certain of said apertures on said vertical members receiving hinge means by which said sides are hinged together, said apertures on said horizontal members being adapted to receive fastening means whereby a poster, advertising sign, and the like, is mounted and held on said A-frame, and coupling means joining certain of said horizontal members of each half of a said side together to form a said side, said vertical and horizontal members being formed of bent and shaped wire and having a leg portion, said certain of said vertical and horizontal members having an open ended U-shaped portion at said end, each said aperture being formed by a said U-shaped portion and a said leg portion of another said member extending across said open end and joined to said member of which said U-shaped portion is a part.

9. The A-frame according to claim 8 in which a said vertical member on each half of each said side has a lower end, said end is bent at an angle to said leg portion and extends beneath said bead of said tire, and said engaging means comprises said angularly bent portions of said vertical members, respectively.

10. An A-frame fur use with a tire, having a wheel opening with a bead therearound to form a signboard, for displaying posters, advertising signs, and the like, said A-frame comprising first and second sides hinged together at the apex of the A, each said side having means for engaging beneath the tire bead, brace means extending between said sides remote from said apex and holding and forcing said engaging means into a coactive engagement with said tire when said A-frame is mounted thereon, each said side comprising two substantially similar halves, each said half comprising a plurality of vertical and horizontal members, certain of said vertical and horizontal members having apertures at their ends remote from said engaging means and the center of said side, respectively, certain of said apertures on said vertical members receiving hinge means by which said sides are hinged together, said apertures on said horizontal members being adapted to receive fastening means whereby a poster, advertising sign, and the like is mounted and held on said A-frame, and coupling means joining certain of said horizontal members of each half of a said side together to form a said side, said brace means comprising a bent and shaped wire member having a straight central portion with two ends, one said end being formed into a closed loop and the other said end being formed with a U-shaped loop having an outwardly facing opening, said closed loop circumscribing at least a portion of a said horizontal member of one said side and having a freely rotatable engagement therewith and said outwardly opening U-shaped loop of said brace means being positionable about said horizontal member of the other said side.

11. An A-frame for use with a tire, having a wheel opening with a bead therearound to form a signboard, for displaying posters, advertising signs, and the like, said A-frame comprising first and second sides hinged together at the apex of the A, each said side having means for engaging beneath the tire bead, brace means extending between said sides remote from said apex and holding and forcing said engaging means into a coactive engagement with said tire when said A-frame is mounted thereon, each said side comprising two substantially similar halves, each said half comprising a plurality of vertical and horizontal members, certain of said vertical and horizontal members having apertures at their ends remote from said engaging means and the center of said side, respectively, certain of said apertures on said vertical members receiving hinge means by which said sides are hinged together, said apertures on said horizontal members being adapted to receive fastening means whereby a poster, advertising sign, and the like, is mounted and held on said A-frame, and coupling means joining certain of said horizontal members of each half of a said side together to form a said side.

12. An A-frame signboard for displaying posters, advertising signs, and the like, comprising first and second sides, hinge means hinging said sides together at the apex of said signboard, brace means spaced from said hinge means, extending between said sides holding said signboard erect, each said side comprising a plurality of vertical and horizontal members, respectively, certain of said vertical and horizontal members having apertures at their ends at said apex and remote from the center of said side, respectively, certain of said apertures on said vertical members receiving means by which said sides are joined together to form said hinge means, and other of said apertures being adapted to receive fastening means whereby a poster, advertising sign, and the like, is mounted and held on said signboard, said vertical and horizontal members being formed of bent and shaped wire and having a leg portion, said certain of said vertical and horizontal members having an open ended U-shaped portion at said end, each said aperture being formed by a said U-shaped portion and a said leg portion of another said member extending across said open end and joined to said member of which said U-shaped portion is a part.

13. An A-frame for use with a tire, having a wheel opening with a bead therearound to form a signboard, for displaying posters, advertising signs, and the like, said A-frame comprising first and second sides, means hinging said sides together at the apex of the A, each said side having means for engaging beneath the tire bead, brace means for extending between said sides and spaced from said hinge means and holding and forcing said engaging means into a coactive engagement with said tire when said A-frame is mounted thereon, each said side comprising two substantially similar halves, each said half side comprising a plurality of vertical and horizontal wire members, respectively, certain of said wire members having apertures at their ends remote from the center of said side, said apertures on said wire members being adapted to receive fastening means whereby a poster, advertising sign, and the like, is mounted and held on said A-frame, and coupling means joining certain of said wire members of each half of a said side together to form a said side.

14. The A-frame according to claim 13 in which said wire members have a leg portion and said first-mentioned certain wire members are bent and shaped to have an open ended U-shaped portion at said ends, respectively, each said aperture being formed by a said U-shaped portion and a said leg portion of another said member extending across said member of which said U-shaped portion is a part and closing said open end of said U-shaped portion.

15. The combination according to claim 12 in which said brace means comprises a rigid bent and shaped wire member hingedly connected to a said side and detachably engaging the other said side.

16. The A-frame according to claim 15 in combination with and mounted on a tire having a bead with said engaging means engaged thereunder and said brace means forcing and holding said engaging means in position.